Aug. 28, 1951 J. F. GRAYSON 2,565,605
OFF-CENTER LOCK
Filed Oct. 13, 1947
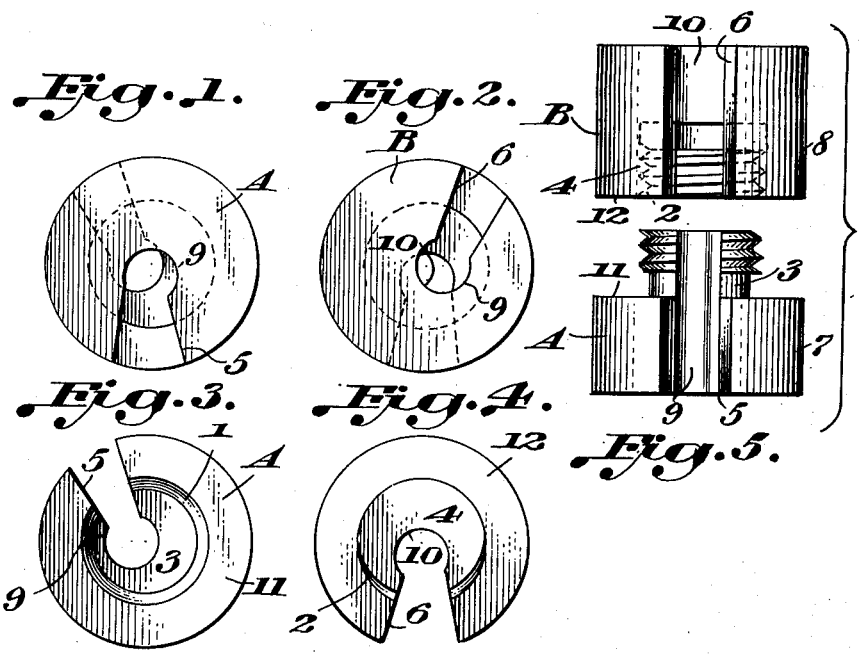
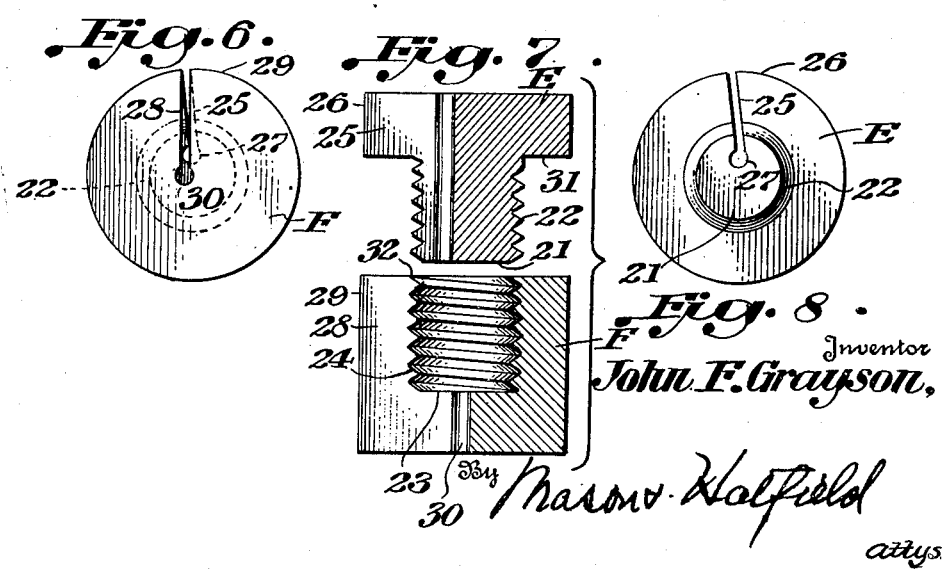
Inventor
John F. Grayson,
By Mason & Halfield
attys Patented Aug. 28, 1951

2,565,605

UNITED STATES PATENT OFFICE 2,565,605

OFF-CENTER LOCK

John F. Grayson, Port Orange, Fla.

Application October 13, 1947, Serial No. 779,618

1 Claim. (Cl. 24—114.5)

This invention relates to an off center lock which may be adjustably attached to cords, ropes, wires both bare and covered, and other flexible things both stranded and unstranded.

An object of the invention is to provide a lock by which an object may be readily attached or detached from a cord, rope, wire, etc.

A further object of the invention is to provide an off center lock for a cord for holding any material in a given place thereon.

An additional object of the invention is to provide an off center lock which may be applied to rigid elongated members such as pipes, rods, etc.

Further objects will appear hereinafter throughout the specification.

In the drawings:

Figure 1 is a top plan view of the stud member of the lock;

Figure 2 is a bottom plan view of the socket member;

Figure 3 is a plan view looking toward the stud of the stud member;

Figure 4 is a plan view looking toward the socket of the socket member;

Figure 5 is a side elevation of both members of the lock shown in separated position;

Figure 6 is a top plan view of the socket member of a third embodiment;

Figure 7 is a vertical sectional view of the members of the third embodiment, said members being in separated position;

Figure 8 is a view looking at the screw-threaded portion of the stud member.

This invention relates to a means for quickly locking said lock onto an elongated element which, if flexible, may be a rope constructed of fiber or of wire, a bare or covered wire, or an elongated rigid element, such as a rod. The invention may be applied to the ropes of draglines or shovels, or to the ropes used in boats, both sail and power boats. It may be applied to a sinker or to floats, or to nets in the fishing art. The lock may be made of all sizes, and may be even small enough to hold on a one-thousandth of an inch strand, or large enough for use on the heaviest types of equipment. The lock of the present invention may be tightened to the extent that it will cut into the fiber or metal of the rope, pipe or rod to which it has been applied, or it may be tightened with just enough pressure to prevent slipping on the rope, pipe or rod. The rope lock of the present invention may be used with a lock washer that can be placed between the engaging faces of the stud and socket members. Moreover, the lock may be provided with one or more holes at the time of manufacture on the side of the lock at any angle desired. The lock may further be constructed with broken threads on either or both of the socket and stud members in order to provide an even quicker engagement between the abutting faces of these members. The members may be provided with either standard or SAE threads.

Referring to Figures 1 to 5 of the drawings, which show one embodiment of the invention, the numeral A indicates the stud member and B indicates the socket member. These members are provided with mating threads 1 and 2. The threads 1 of the stud member are mounted on or form part of the stud 3. The threads 2 are mounted on and form part of the socket 4.

Member A is provided with a slot 5 and member B is provided with a slot 6. These slots extend from the peripheries 7 and 8, respectively, of the members A and B, toward a cylindrical hole 9 in member A and 10 in member B.

Members A and B are preferably provided with flat abutting faces 11 and 12 so that when the members A and B fully engage each other these faces are in engagement.

It will be particularly noted that the holes 9 and 10, when one member is rotated toward the other member, tend to disalign themselves. They may be brought into alignment by rotating the members in the opposite direction, i. e., when they partially engage each other and preferably when the slots 5 and 6 are in alignment with each other. It is in this position that the rope, cable, pipe, or wire is moved through the slots and into the cylindrical holes 9, 10. The parts are then rotated toward each other, whereupon the holes 9, 10 no longer are aligned, the parts assuming the position shown in Figures 1 and 2. In this position the object held in the holes will be tightly grasped by the cylindrical side walls of the holes.

It is to be understood that throughout the several figures both of the cylindrical holes are equally eccentric with reference to the stud or socket, and the sides of the members may be either cylindrical as shown or multi-sided, oval, or in any other suitable shape.

In the form shown in Figures 6 and 7, E is the stud member and F the socket member. The stud member E has a stud 21 provided with threads 22 and the socket member F is provided with a socket 23 having threads 24. The stud member also is provided with a slot 25 extending from the side 26 and terminating in the hole 27 which is off center to the axis of the stud.

The socket member F has a slot 28 which extends from the side 29 and terminated in the hole 30. The members having abutting faces 31 and 32. When the parts are partially threadedly engaged, the holes 27 and 30 may be brought into alignment by such rotation. In this position the slots 25 and 28 are in alignment with each other.

The form shown in Figure 12 is that of a double stud member G. This stud member may be used with the socket members shown in other figures, such as B, D, or F. In this fourth embodiment the side is indicated at 33, the oppositely extending studs at 34, 35, having threads 36, 37, respectively, and the disaligned apertures 38, 39, respectively. Although Figure 12 shows these apertures meeting at the opening 40, the meeting of these apertures is not necessary, and the apertures may be drilled to provide dead ends for these apertures or passages.

The sides of all of the locking members shown in the figures may be round, as shown, or they may be square or hexagonal in cross section, to facilitate turning of one member relative to the other by means of a wrench.

The members may be made of various kinds of material, such as plastic material, fiber, wood, or any suitable metal such as lead, brass, steel, depending upon the use of the lock.

It is to be expressly understood that either one, or both, holes or apertures such as 9 and 10 of Figures 1 and 2; 27, 30 of Figures 6, 7 and 8 are equally eccentric with regard to the axis of the stud and socket. The requirement in any case is that the stud member and socket member may be relatively rotated while in partially screw-threaded engagement with each other so as to bring the apertures of both into substantial alignment. It is while in this position that the elongated element, such as the rod, or wire, may be inserted or threaded into or through both apertures.

I desire to comprehend within my invention all embodiments which come within the reasonable scope of the appended claim.

I claim:

In a device of the character described, a threaded male member including a shoulder and a stud, a concentric threaded female member including an opposite shoulder and a socket engageable by said stud, said male member having a longitudinally extending aperture therein, said female member having a longitudinally extending aperture therein, said two apertures forming a concentric bore when aligned, said apertures being aligned when said members are in partially screw threaded engagement and said shoulders spaced apart, said two apertures being eccentric relative to the axis of said stud and socket whereby partial rotation of said male and female members relative to each other to bring said shoulders into firm abutting relation disaligns said first and second mentioned apertures to reduce the relative diameter of the composite bore formed by said two apertures to effect a clamping action on an article passed through said bore, and longitudinal slots extending through the side walls of both of said members and intersecting said apertures, said slots being aligned to permit the insertion of an elongated article fitting into said bore when said apertures are aligned in non-clamping position.

JOHN F. GRAYSON.

REFERENCES CITED

The following references are of record in the file of this patent:

UNITED STATES PATENTS

| Number | Name | Date |
|---|---|---|
| 91,319 | Fifield | June 15, 1869 |
| 285,267 | How | Sept. 18, 1883 |
| 402,231 | Coles et al. | Apr. 30, 1889 |
| 811,906 | Dossert | Feb. 6, 1906 |
| 1,010,301 | Neats | Nov. 28, 1911 |
| 1,646,660 | Prince | Oct. 25, 1927 |
| 1,989,861 | Hixon | Feb. 5, 1935 |